(12) United States Patent
Edge et al.

(10) Patent No.: US 7,120,240 B2
(45) Date of Patent: Oct. 10, 2006

(54) METHOD FOR AUDITORY DIFFERENTIATION OF FORWARDED PHONE CALLS

(75) Inventors: Brandi Edge, Meridianville, AL (US); Rolanda Carter, Huntsville, AL (US); Gail Perez, Owens Cross Roads, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/228,922

(22) Filed: Aug. 28, 2002

(65) Prior Publication Data

US 2004/0042603 A1    Mar. 4, 2004

(51) Int. Cl.
H04M 3/42 (2006.01)
H04M 1/00 (2006.01)

(52) U.S. Cl. .............................. 379/211.02; 379/207.16; 379/211.01; 379/373.02

(58) Field of Classification Search ........... 379/211.02, 379/211.01, 373.02, 215.01, 211.03, 211.04, 379/207.16, 374.01, 374.02, 375.01, 418
See application file for complete search history.

(56) References Cited

U.S. PATENT DOCUMENTS

| | | | |
|---|---|---|---|
| 4,058,672 A | 11/1977 | Crager et al. | 178/3 |
| 4,058,838 A | 11/1977 | Crager et al. | 358/257 |
| 4,887,265 A | 12/1989 | Felix | 370/94.1 |
| 5,881,064 A | 3/1999 | Lin et al. | 370/395 |
| 6,125,127 A * | 9/2000 | Smith, Jr. | 370/524 |
| 6,353,610 B1 | 3/2002 | Bhattacharya et al. | 370/352 |
| 6,704,405 B1* | 3/2004 | Farris et al. | 379/215.01 |
| 6,718,026 B1* | 4/2004 | Pershan et al. | 379/211.01 |

* cited by examiner

*Primary Examiner*—Bing Q. Bui
(74) *Attorney, Agent, or Firm*—Bambi Falvre Walters; Walters & Zimmerman, PLLC (57) ABSTRACT

The present invention is directed to the auditory differentiation among forwarded phone calls within a phone network, and in particular an advanced intelligent phone network. Unique distinctive forwarded ring alerts and distinctive forwarded call waiting alerts are assigned to selected subscriber phone numbers in the phone network. Upon the forwarding of one or more of these subscriber phone numbers to a target phone number within the telephone network, auditory differentiation between the forwarded phone numbers and the target phone number can be achieved by a customer.

10 Claims, 5 Drawing Sheets

METHOD FOR AUDITORY DIFFERENTIATION OF FORWARDED PHONE CALLS

TECHNICAL AREA

The present invention relates to telephony and more particularly to forwarding calls in an advanced intelligent telephone network.

BACKGROUND

Modern public switched telephone networks (PSTN) have separate paths for voice circuits (or other customer-utilized communication circuits) and for information transmitted throughout the network that controls the connection and disconnection of the voice circuits. By contrast, earlier versions of public switched telephone networks transmitted tone signals over the same circuits used as voice paths to control set-up and takedown of calls, to create billing records, and to provide other control for the telephone network.

In the late 1970s and early 1980s, American Telephone & Telegraph Company (AT&T) developed early versions of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling the identity of the called number can be transmitted over the interoffice signaling data links from the originating central office to the terminating central office.

The terminating central office is the central office that services the called number. If the called number is busy, data representing this information is transmitted back over the interoffice signaling link to the originating central office that locally provides an audible busy signal to the caller. Therefore, no long distance trunk capacity is occupied during this process, and the voice circuits remain free for other uses. If the called number is not busy, various devices in the network respond to the information about this call to assign interoffice trunks to set up a connection for the call. While the call is being set up, the originating central office, based on a signal from the terminating central office, returns an audible ring back tone to the caller. Once the called number is answered, an answer signal is passed from the terminating central office to the originating central office, the ring back tone is terminated, and the call is completed.

The public switched telephone network which evolved in the 1980s was designed by AT&T and includes the concept of the "Intelligent Network." The intelligent network concept was expanded through industry consensus in the early 1990s and has become the Advanced Intelligent Network (AIN). The AIN enables telecommunications call control and database access from any computer or switching system connected to the Signaling System 7 (SS7) network. The Signaling System 7 (SS7) network refers to the current implementation of the CCIS control network used in the United States. The Advanced Intelligent Network (AIN) is a standard call control protocol which uses the SS7 network for message transport.

The AIN makes possible a variety of services for customers or subscribers to the AIN. One such service, referred to as call forwarding, permits a subscriber at a first subscriber location to have the phone calls that are destined for that first location forwarded to a second subscriber location on the telephone network. Therefore, the subscriber can have important phone calls forwarded so that these phone calls are not missed. Often, customers have multiple phones or subscriptions on the network such as one or more business phones, residential phones, and mobile or cellular phones, each having a separate phone number, and call forwarding allows a customer to forward business numbers to a cell phone while the customer is away from the office at lunch, meetings, or social functions. Even though several different phone numbers representing, for example, different businesses are forwarded to a single number, all forwarded calls will produce identical rings at the phone to which they have been forwarded. Therefore, the customer can not differentiate between a social call and important business calls. In addition, if one customer's calls are forwarded to another customer's phone, both customers need to be able to differentiate among the calls intended for either customer. In the case where the phone to which the calls have been forwarded is in use and that phone has a call waiting feature, the customer needs to know which announced waiting calls are potential important business calls.

One potential solution is a service known as caller identification where the identity of the calling party is displayed at the receiving phone. However, not all phones are equipped with this feature and this feature can be blocked by the calling party. In addition, this feature requires the user to be close to the phone and to view a display screen on the phone. These requirements present difficulties particularly for sight impaired subscribers. In addition, although the party placing the call may be displayed by caller identification, the number being called may not. Therefore, the customer viewing the caller identification screen must determine which number from among the multiple forwarded phone numbers is being called.

SUMMARY OF THE INVENTION

The present invention provides a solution to these problems by providing a method for auditory differentiation among multiple forwarded phone calls in a phone network and in particular an AIN.

In the method of the present invention, a customer selects at least one or more subscribers having a subscriber phone number from a potential plurality of subscribers in the telephone network and assigns a distinctive forwarding ring alert to each selected subscriber phone number. This information is logged into a database that is accessible and readable by the telephone network. The distinctive forwarded phone ring alert can be assigned and logged into the database by a customer through the use of customer premises equipment (CPE), such as a telephone, through the AIN or may be logged into a database in a computer network external to the telephone network. The customer can connect to this computer network using the CPE. In an AIN, a trigger related to the forwarding of the subscriber phone number is placed on the service switching point (SSP) associated with the subscriber phone number. The customer then forwards at least one and potentially all of the selected subscriber phone numbers to a target phone number in the telephone network.

Upon initiation of a call to one of the forwarded subscriber phone numbers, the distinctive ring alert assigned to that forwarded subscriber phone number is announced at the target phone number. Within the AIN, the trigger associated with the SSP attached to the forwarded subscriber phone number contacts a service control point (SCP) within the telephone network which accesses the database in which the forwarded ring alert has been logged. Based upon the logged information in the database, the SCP sends instructions back to the SSP to announce the forwarded distinctive ring alert assigned to the forwarded subscriber phone number at the target phone number.

In addition to distinctive forwarded ring alerts, the present invention is also directed to distinctive forwarded call waiting alerts assigned to forwarded subscriber phone numbers. These distinctive forwarded call waiting alerts are announced at the target phone number when the target phone number or phone line is busy or occupied.

The distinctive forwarded ring alerts and distinctive forwarded call waiting alerts are unique so that when a plurality of subscriber phone numbers are forwarded to the same target phone number in the network, the forwarded ring alerts announced can be differentiated among each other. In addition, the distinctive forwarded ring alerts are unique and distinct from the target phone number ring alert.

DETAILED DESCRIPTION OF THE PREFERRED EMBODIMENT

The method of the present invention can be used with any type of telephone network that interconnects a plurality of subscribers and provides services to these subscribers including call forwarding and call waiting. Suitable telephone network structures such as the AIN are described, for example, in U.S. Pat. Nos. 5,838,774 and 5,701,301, the entire disclosures of which are hereby incorporated herein by reference.

Figure 1:
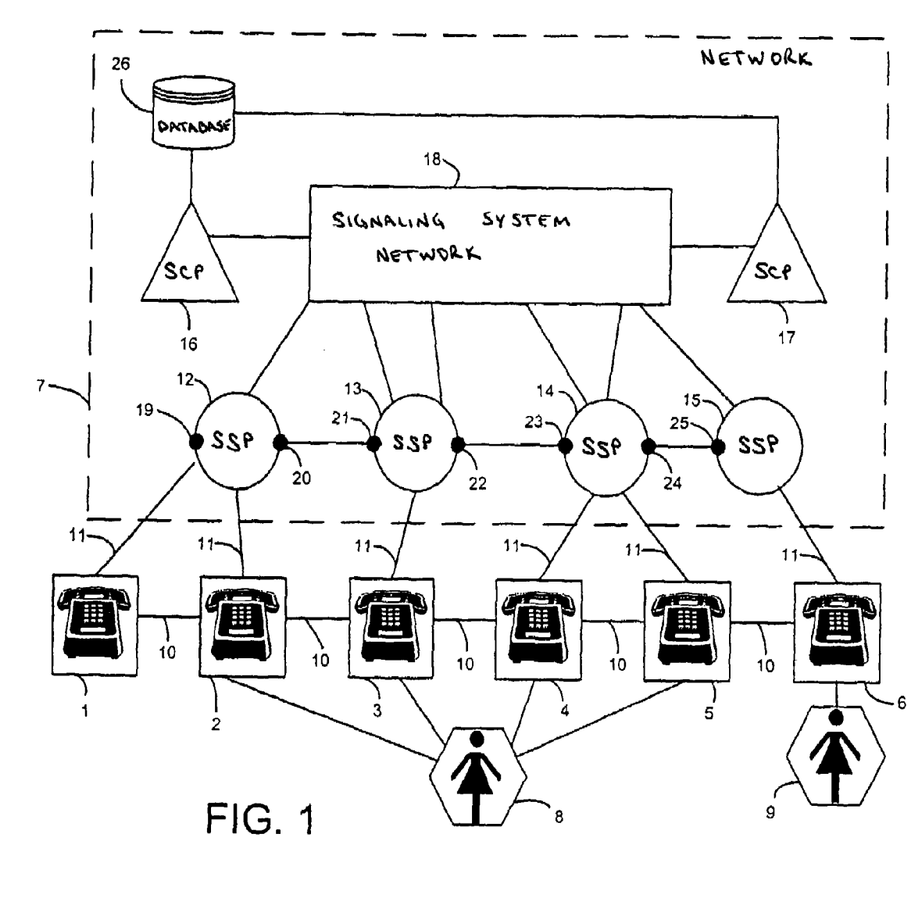
FIG. 1 is a schematic representation of an embodiment of an advanced intelligent telephone network for use with the method of the present invention.

Referring initially to FIG. 1, the method of the present invention provides auditory differentiation of phone calls forwarded among a plurality of subscribers 1–6 attached and linked to a telephone network 7, preferably an AIN. Customers of the telephone network in return for the payment of a subscription fee are provided access to or assigned the right to use one or more of these subscribers. For example, a first customer 8 may have multiple subscribers 2–5 linked to the network 7. Each one of these subscribers 2–5 relates to a different service or physical location, for example, a residential subscriber 2, a first business subscriber 3, a second business subscriber 4, and a mobile or cellular phone subscriber 5. A second customer 9 may only have a single subscriber 6 corresponding to a residential address. In addition, another subscriber 1 may be linked to the network and assigned to devices such as public phones. Each subscriber 1–6 contains a unique subscriber phone number and CPE. Suitable CPE includes telephones, modems, telefacsimile machines, and answering machines. All of the subscribers 1–6 are linked together by a plurality of trunk circuits 10. The trunk circuits 10 carry the voice or data communications among the subscribers. Suitable arrangements and operations of the trunk circuits are well known to those of ordinary skill in the art. Although only six subscribers are shown, suitable telephone networks for use with the method of the present invention can have thousands and millions of interconnected subscribers.

The subscribers 1–6 are attached to the network 7 through a plurality of links 11 that connect each subscriber to one of a plurality of SSPs 12–15. Each SSP can have one or more subscribers connected to it. The SSPs are interconnected with each other and with one or more SCPs 16, 17 in the network. These interconnections permit the SSPs and SCPs to communicate across the network. The SSPs are connected to the SCPs through a signaling system network 18. Suitable signaling system networks include signaling system 7 (SS7). Various arrangements and operations of these elements are suitable for use with the method of the present invention as would be understood by one of ordinary skill in the art.

Associated with each SSP are one or more triggers 19–25. these triggers, sometimes referred to as, for example, termination attempt triggers, are associated with the subscriber phone numbers of the subscribers attached to that particular SSP. When one subscriber attempts to terminate a call to another subscriber phone number, the trigger associated with that phone number contacts the SCP across the network. The SCP searches a database (referred to as "Database" or the abbreviation "DB" in the figures) 26 for an appropriate response to the trigger and returns instructions to the SSP. For example, the SCP may determine that the phone number is busy and that subscriber does not have call waiting; therefore, an instruction is sent to announce a busy tone to the originating subscriber.

Figure 2:
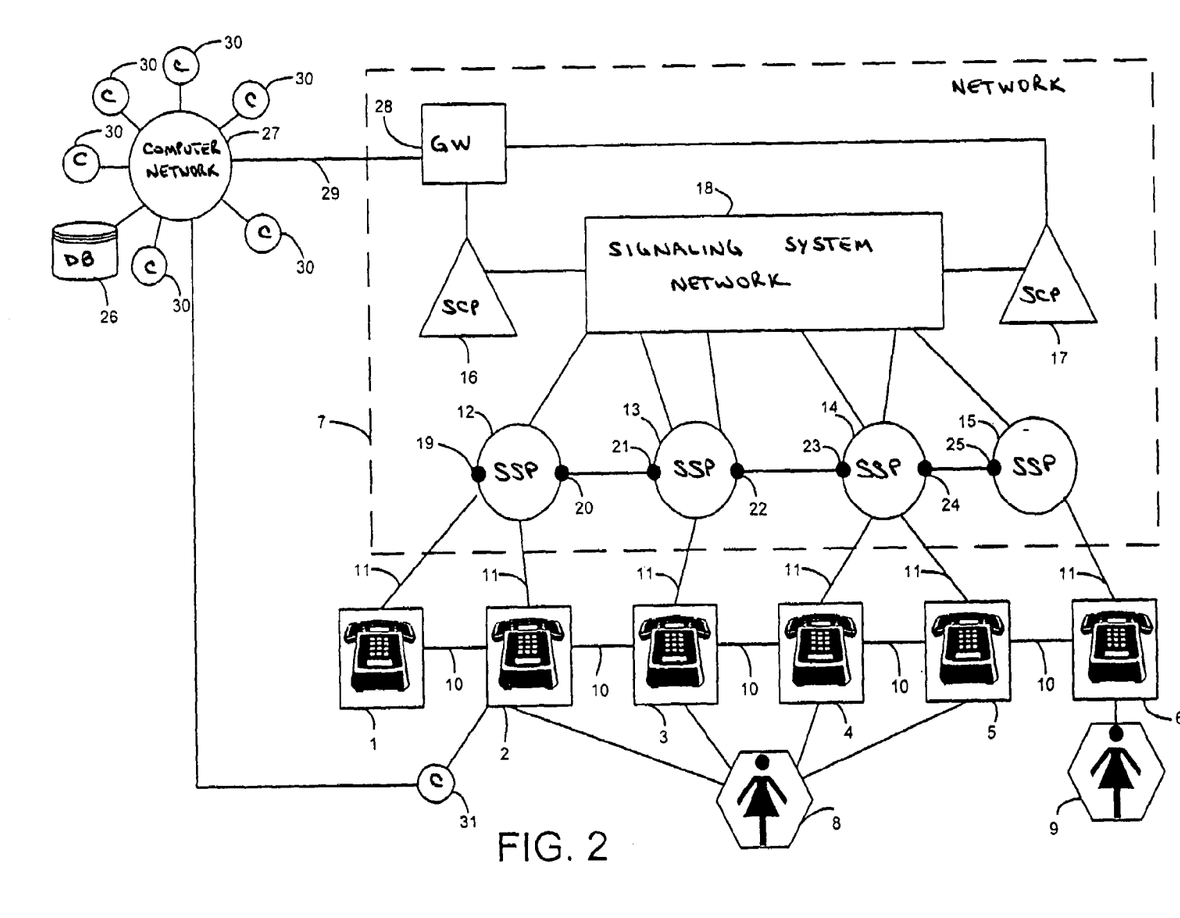
FIG. 2 is a schematic representation of another embodiment of the advanced intelligent telephone network.

The database 26 can be directly connected to the SCP as is shown in FIG. 1. Access to this data base by a customer is through the CPE at a subscriber. In another embodiment, as is shown in FIG. 2, the database 26 can be connected to a computer internet or intranet referred to as "Computer Network" in the figures) 27 external to the telephone network 7 containing a plurality of computers (referred to as the abbreviation "C" in the figures) 30. In an alternative embodiment, the computer network is internal to the telephone network. Each SCP 16, 17 interfaces with this database 26 through a gateway (referred to as the abbreviation "GW" in the figures) 28 across a data link 29. Suitable data links include TCP/IP type data links. Access to this database 26 by a customer is through a customer computer (also referred to as the abbreviation "C" in the figures) 31 connected to the computer network 27. Alternatively, the CPE of a subscriber can be used to log-on to a network computer 30 to access the database 26.

Figure 3:
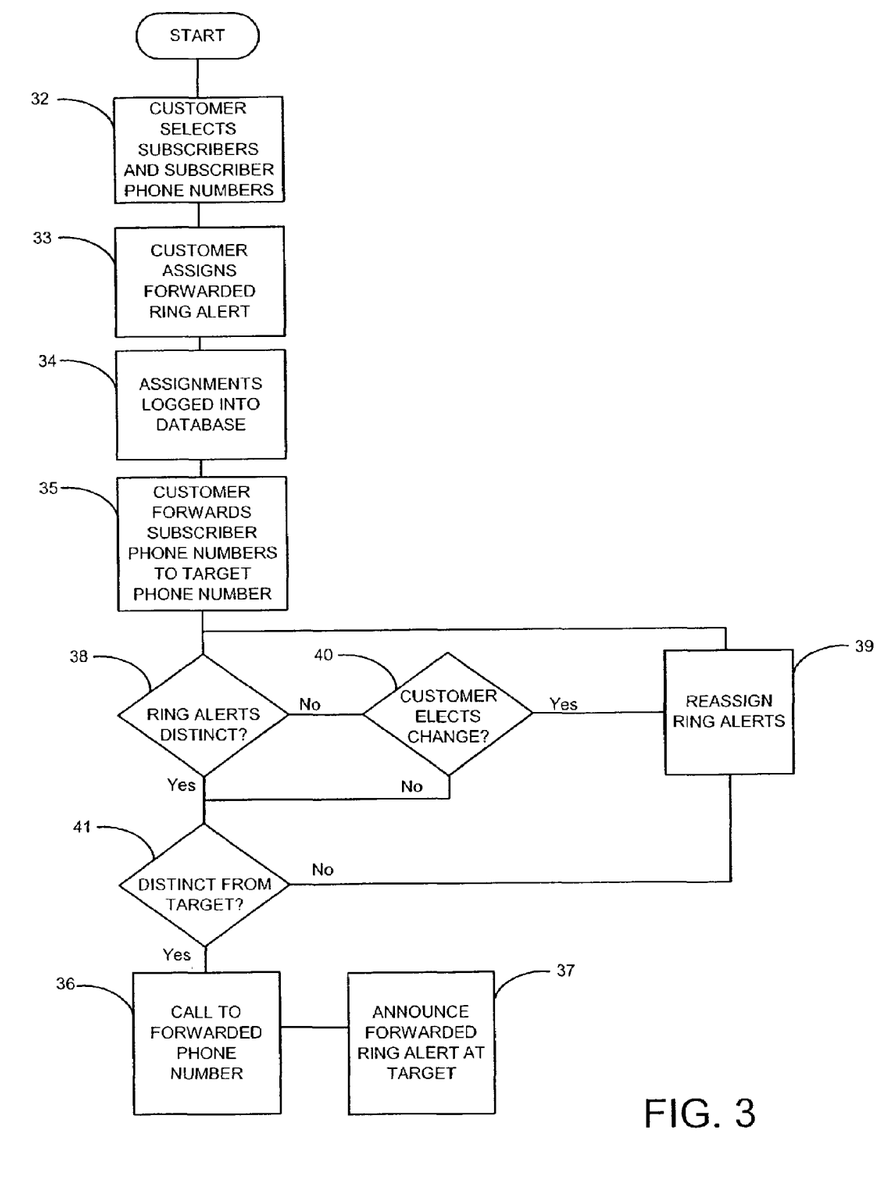
FIG. 3 is a flowchart illustrating an embodiment of the method of the present invention.

In one embodiment of the method according to the present invention as is illustrated in FIG. 3, a customer selects at least one subscriber phone number from the plurality of subscriber phone numbers associated with the telephone network 32, and assigns a distinctive forwarded ring alert to that subscriber phone number that the customer associates with that particular subscriber phone number 33. A ring alert is an arrangement of one or more tones, sounds, bells, songs and combinations thereof. Suitable ring alerts include distinct or unusual sounds and patterns or pulses of bells or rings. Distinctiveness can also be achieved by varying the tone, pitch or loudness of a single sound. In one embodiment, these ring alerts are stored and generated from the network. Alternatively, the customer selects these ring alerts from a list of ring alerts resident in the CPE. For example, electronic cellular phones contain short clips of various familiar or popular songs. The ring alert would instruct the cellular phone to play one of these songs. Each forwarded ring alert has enough distinctiveness so that a customer can easily and readily associate it with the appropriate subscriber phone number. In another embodiment, the customer selects a plurality of subscriber phone numbers 32, and assigns a different or unique distinctive forwarded ring alert to each one of the selected subscriber phone numbers that the customer can associate with each selected subscriber phone number 33.

The assigned association between each selected subscriber phone number and the forwarded ring alerts are logged or stored into the database for access by the telephone network 34. In one embodiment, logging of this information into the database is accomplished across the telephone network by a customer using the CPE at a subscriber on the telephone network, for example the keypad on a telephone. In another embodiment, the customer uses a computer to interface with the database through, for example, a computer intranet or internet such as a World Wide Web-type internet. Using a computer to log the data provides the benefits of a user-friendly windows-type interface for data entry. In addition, lists of ring alerts and subscriber phone numbers can be displayed along with any current or past associations. Ring alerts can be previewed, and a log of assigned forwarded ring alerts can be stored for quick reference by the customer. In another embodiment, multiple subscriber phone numbers belonging to the same customer can be assigned identical ring alerts so as to be more readily associated with that customer.

After the selected subscriber phone numbers and assigned forwarded ring alerts are logged into the database, at least one of the selected subscriber phone numbers can be forwarded to a target phone number for a subscriber in the telephone network 35. That subscriber can be associated with the same customer or with a different customer. In an alternative embodiment, two or more of the selected subscriber phone numbers are forwarded to the target phone number 35. Suitable methods to forward the subscriber phone numbers include the same methods used by customers to log the forwarded ring alerts into the database. Upon initiation of a call to one of the forwarded selected subscriber phone numbers 36, the distinctive forwarded ring alert assigned to that forwarded subscriber phone number is announced at the subscriber using the target phone number 37.

Since the target phone number has a target ring alert of its own, when a subscriber phone number is forwarded to the target phone number a comparison is made by the telephone network between the target ring alert 41 and each forwarded ring alert 38. Each forwarded ring alert is adjusted 39 accordingly, if necessary, to ensure auditory differentiation between the target ring alert and each forwarded ring alert. These adjustments can be made automatically by the telephone network or manually by the customer following prompting by the telephone network. In addition, when multiple subscriber phone numbers are forwarded to a single target phone number, a comparison is made among the forwarded ring alerts 38 and adjustments 39 are made accordingly. In this embodiment, the customer has the option not to change the forwarded ring alerts 40 if, for example, it is desired that all forwarded calls produce an identical ring alert at the target phone number.

Figure 4:
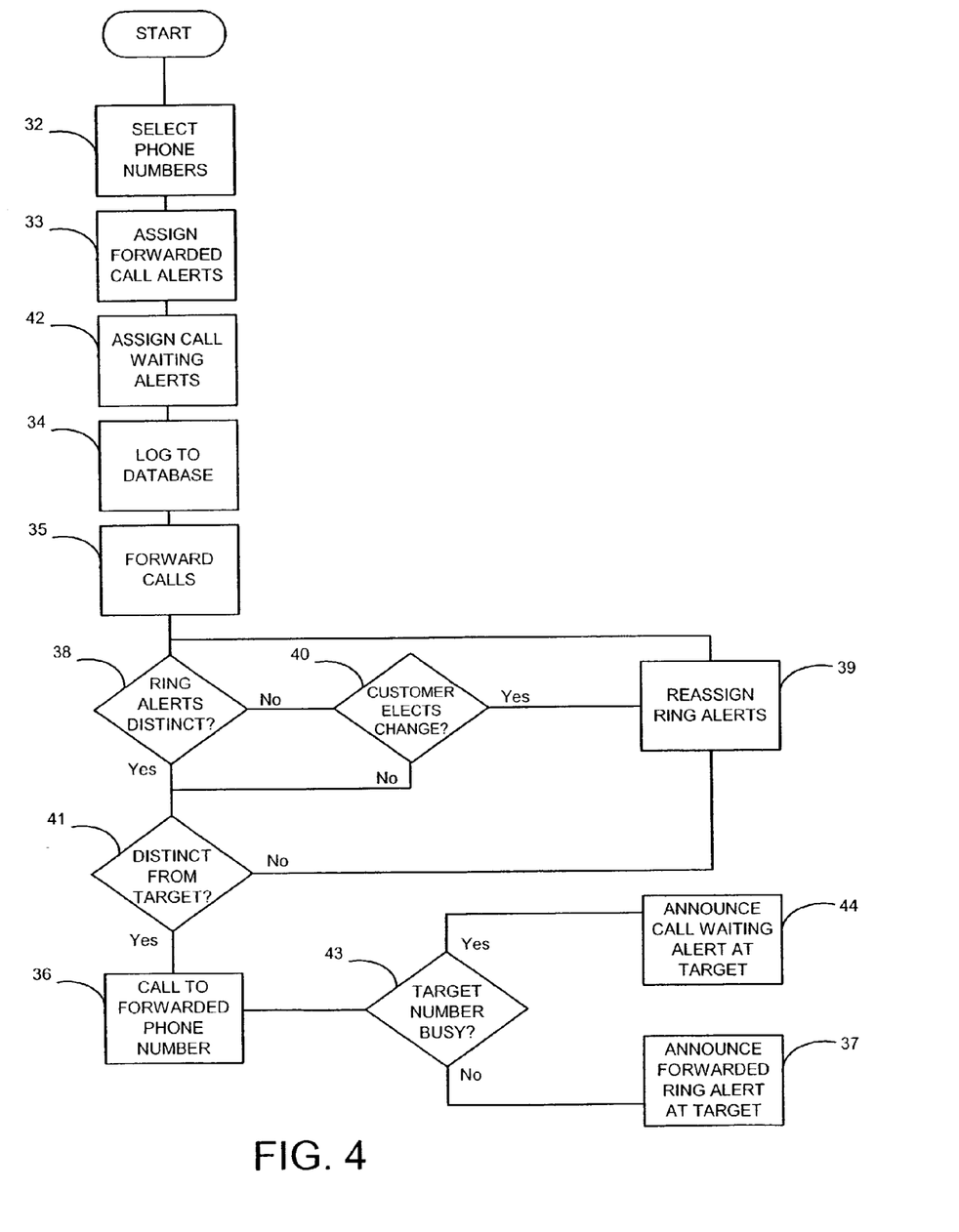
FIG. 4 is a flowchart illustrating another embodiment of the method of the present invention.

As illustrated in FIG. 4, a customer can assign a unique and distinctive forwarded call waiting alert to each of the selected subscriber phone numbers in addition to forwarded ring alerts 42. The available forwarded call waiting alerts and the method of their assignment, logging, and use are the same as for the forward call alerts. Upon initiation of a call to one of the forwarded selected subscriber numbers 36 that is contemporaneous with a previously connected call to either the same forwarded subscriber number, another forwarded subscriber number or the target phone number 43, the distinctive forwarded call waiting alert associated with the subsequently called forwarded selected subscriber number is announced at the target phone number 44.

The method of the present invention, in addition to being suitable for use in telephone networks utilizing a Public Switched Telephone Network (PSTN), such as the AIN, and circuit-switched trunk circuits interconnecting the subscribers, is suitable for use with packet-switched telephone networks wherein voice, video, and data are carried across the same network. Suitable arrangements of packet switched networks for use with the method of the present invention are illustrated, for example, in U.S. Pat. Nos. 4,887,265, 5,881,064, and 6,353,610.

Figure 5:
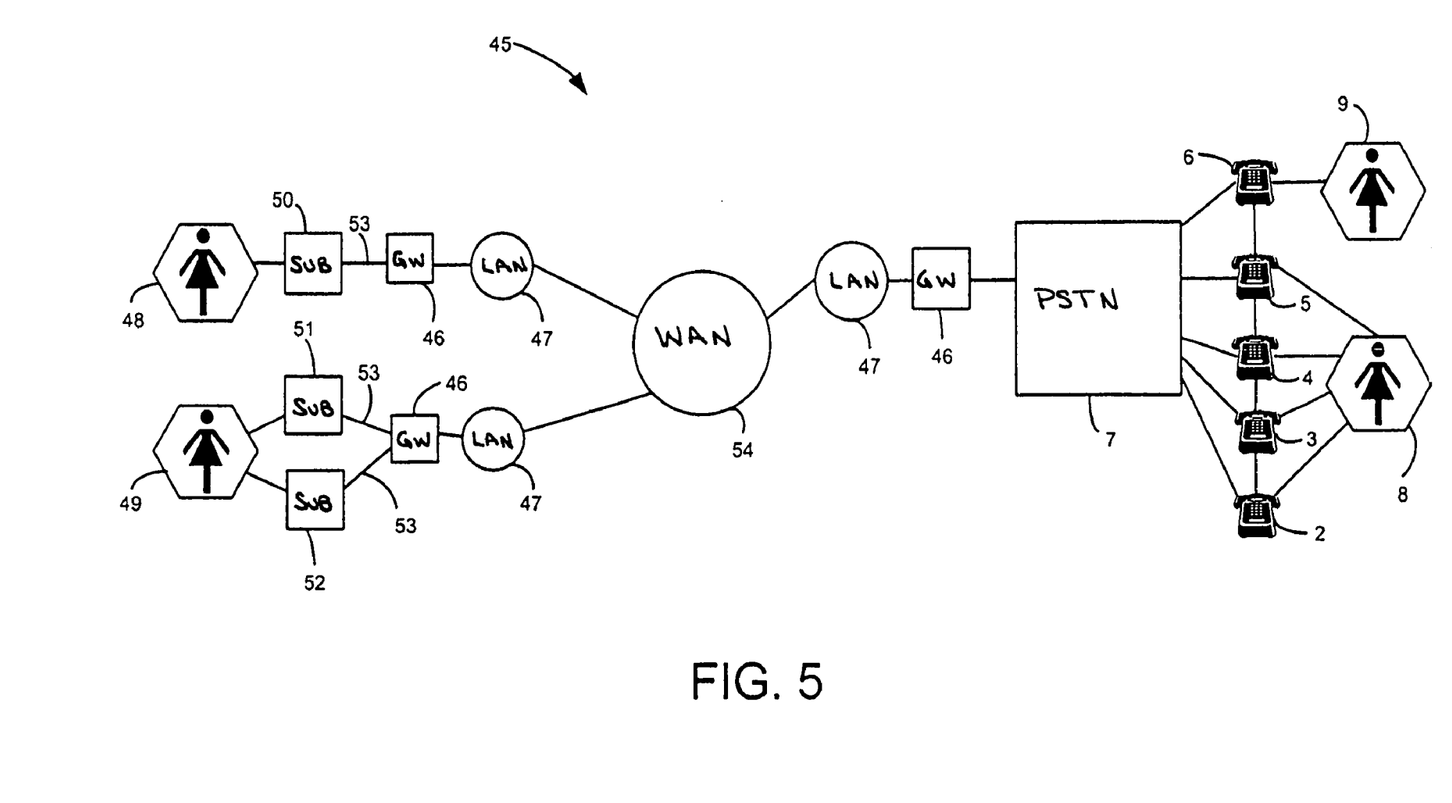
FIG. 5 is a schematic representation of a packet-switched network for use with the method of the present invention.

Referring to FIG. 5, an example of a packet-switched telephone network 45 for use with the method of the present invention is illustrated. Customers 8, 9 having subscribers 2–6 attached to and in communication with a PSTN 7 interface with the network through one or more gateways 46 attached to and in communication with one or more local area networks (referred to as the abbreviation "LAIN" in the figures) 47. Additional customers 48, 49 each having one or more subscribers (referred to as the abbreviation "SUB" in the figures) 50–52 with associated and assigned subscriber phone numbers are attached through suitable communications lines 53, for example Private Branch Exchange lines, to one or more gateways 46 attached to one or more local area computer networks 47. All of the computer networks are attached to and in communication with a wide area network (referred to as the abbreviation "WAN" in the figures) or internet 54 such as the World Wide Web. Suitable protocols for communication across and among the intranets and internets of the network 45 include IP.

Customers log or store information regarding the assignment of forwarded ring alerts and forwarded call waiting alerts to specific subscriber phone numbers in databases (not shown) that are disposed in the internets and local area networks of the packet-switched network 45 or in the PSTN 7. The network assigns suitable addresses for the subscriber phone numbers on the network as needed. Routing and subscriber status information are maintained in the computers, LANs, routers, switches, multiplexors and demultiplexors contained within the network 45. Packeting, mulitplexing, and compressing of data and voice signals for transport across the network 45 are handled using available protocols for packet-switched networks. Upon initiation of a call from a first subscriber 50 to a forwarded subscriber phone number for a second subscriber 6, the called subscriber phone number is received at the gateway 46 associated with the first subscriber 50 and matched to an address in the network 45 for that number. Information about that address including the status of the line (i.e. busy), forwarding information, and subscribed services, for example call waiting, are obtained from the network, network gateways 46 and databases. The initiated call is then disposed of in accordance with this information. For example, the call is forwarded across the network 45 to a target third subscriber and a forwarded ring alert or forwarded call waiting alert is announced at that target subscriber.

Referring again to FIG. 1, in one embodiment of the method of the present invention, a customer 9 selects a subscriber 6 to be forwarded and assigns a distinctive forwarded call alert and a distinctive forwarded call waiting alert to the subscriber phone number associated with that subscriber 6. The customer 9 logs this information into the database 26 using the CPE at the subscriber 6. A call forwarding trigger 25 is placed at the SSP 15 attached to and in communication with the subscriber 6. The customer 9 then forwards the subscriber phone number associated with that subscriber to a target phone number associated with another subscriber 1. Upon a termination attempt to the forwarded subscriber number by a third subscriber 2, the trigger 25 on the SSP 15 attached to the subscriber 6 associated with the forwarded subscriber phone number will send a request to the SCP 17 across the signaling service network 18. This request relates to the forwarded ring alert and forward call waiting alert associated with the forwarded phone number. The SCP 17 will search the internal network database 26 to which it is attached for the association between the forwarded phone number and the forwarded ring alert and forwarded call waiting alert. The status of the target phone number is also checked, and the SCP 17 instructs the SSP 15 to announce the forwarded ring alert at the target phone number if that number is available or to announce the forwarded call waiting alert if the target phone number is busy.

In another embodiment of the present invention as is best illustrated in FIG. 2, a customer 8 assigns unique forwarded ring alerts and forwarded call waiting alerts to a plurality of subscribers 2–5 on the network 7. These associations are logged into a database 26 that is part of an internet 27 external to the telephone network 7. Triggers 20–24 are placed on the SSPs 12–14 to which these subscribers are attached and are in communication. The customer 8 then selects a plurality of the subscriber phone numbers to be forwarded to a target phone number. For example, the customer 8 can forward two business subscribers 3, 4 to a target subscriber 5 associated with the customer's cell phone. Alternatively, the customer's residential subscriber 2 and cellular subscriber 5 can be forwarded to another customer's 9 residential subscriber 6 phone number. The ring alerts and call forwarding alerts among the target phone numbers and the forwarded subscriber numbers are compared for auditory differentiation, and adjustments are made if necessary. When a call is attempted to one of the forwarded subscriber phone numbers by another subscriber 1, the trigger 21 placed on the SSP 13 associated with that subscriber 3 sends a request through the signaling system 18 to the SCP 16. The SCP checks the database 26 in the external computer network 27 through a gateway 28 and across a data link 29. Based upon the information contained in the database and the status of the target phone number, the SCP 16 returns instructions to announce the forwarded ring alert or forwarded call waiting alert at the target phone number.

While the present invention has been described and illustrated herein with respect to the preferred embodiments, it should be apparent that various modifications, adaptations, and variations may be made utilizing the teachings of the present disclosure without departing from the scope of the present invention and are intended to be within the scope of the present invention.

What is claimed is:

1. A method for the auditory differentiation of forwarded phone calls in a phone network, the method comprising:
   selecting a plurality of subscriber phone numbers in the phone network;
   assigning a distinctive forwarded ring alert to each of the selected plurality of subscriber phone numbers, the distinctive forwarded ring alert identifying a call to the assigned subscriber phone number that is forwarded to a target phone number;
   forwarding calls of two or more of the selected plurality of subscriber phone numbers to the target phone number in the phone network; and
   announcing the distinctive forwarded ring alert assigned to the forwarded selected subscriber phone number at a target phone of the target subscriber phone number upon initiation of a call to one of the forwarded selected subscriber phone numbers such that the distinctive ring alert differentiates the call from another distinctive ring alert of another call forwarded from another selected subscriber phone number to the target subscriber phone number.

2. The method of claim 1, wherein the target phone number comprises a target ring alert, and the method further comprises:
   comparing the target ring alert to the forwarded ring alert of each forwarded subscriber phone number; and
   adjusting each forwarded ring alert as necessary to ensure auditory differentiation between each forwarded ring alert and the target ring alert.

3. The method of claim 1, further comprising logging each selected subscriber phone number and assigned forwarded ring alert to a database accessible by the telephone network.

4. The method of claim 3, wherein the step of logging each subscriber phone number and forwarded ring alert is executed by a customer through a telephone connected to the telephone network.

5. The method of claim 3, wherein the step of logging each subscriber phone number and forwarded ring alert is executed by a customer through a computer linked to the database.

6. The method of claim 5, wherein the computer is linked to the database through a computer internet.

7. The method of claim 1, further comprising:
   assigning a distinctive forwarded call waiting alert to each one of the selected plurality of subscriber phone numbers; and
   announcing the distinctive forwarded call waiting alert assigned to the forwarded selected subscriber phone number at the target phone upon initiation of a call to the forwarded selected subscriber phone number such that the distinctive call waiting alert differentiates the call from another distinctive call waiting alert to another forwarded selected subscriber phone number of the target phone.

8. The method of claim 1, wherein the telephone network is a packet-switched telephone network.

9. A storage medium on which is encoded instructions for performing:
   selecting a first subscriber and a second subscriber in a communications network, the first subscriber comprising at least one first subscriber communications address and the second subscriber comprising at least one second subscriber communications address;
   assigning a distinctive forwarded first subscriber ring alert for the first subscriber;
   assigning a distinctive forwarded second subscriber ring alert for the second subscriber;
   forwarding a call to the first subscriber to a target phone number;
   forwarding another call to the second subscriber to the target phone number;

announcing the distinctive forwarded first subscriber ring alert at a target phone associated with the target phone number, the distinctive forwarded first subscriber ring alert announced upon initiation of the call to the first subscriber such that the distinctive forwarded first subscriber ring alert identifies the call for the first subscriber; and announcing the distinctive forwarded second subscriber ring alert at the target phone associated with the target phone number, the distinctive forwarded second subscriber ring alert announced upon initiation of the other call to the second subscriber such that the distinctive forwarded second subscriber ring alert identifies the other call for the second subscriber.

10. The storage medium of claim 9, on which is encoded further instructions for performing:

assigning a first unique forwarded call waiting alert to each communications address of the first subscriber;

assigning a second unique forwarded call waiting alert to each communications address of the second subscriber;

announcing the first unique forwarded call waiting alert via the target phone upon initiation of the call to the forwarded communications address of the first subscriber such that the first unique call waiting alert differentiates the call for the first subscriber during an off-hook state of the target phone; and announcing the second unique forwarded call waiting alert via the target phone upon initiation of the call to the forwarded communications address of the second subscriber such that the second unique call waiting alert differentiates the call for the second subscriber during an off-hook state of the target phone.

* * * * *